US009294571B2

(12) United States Patent
Noldus (10) Patent No.: US 9,294,571 B2
(45) Date of Patent: Mar. 22, 2016

(54) METHOD AND SYSTEM OF TRANSFERRING A MESSAGE IN A SESSION INITIATION PROTOCOL BASED COMMUNICATIONS NETWORK

(75) Inventor: Rogier August Caspar Joseph Noldus, Goirle (NL)

(73) Assignee: TELEFONAKTIEBOLAGET L M ERICSSON (PUBL), Stockholm (SE)

( * ) Notice: Subject to any disclaimer, the term of this patent is extended or adjusted under 35 U.S.C. 154(b) by 849 days.

(21) Appl. No.: 13/497,721

(22) PCT Filed: Oct. 21, 2009

(86) PCT No.: PCT/EP2009/063815
§ 371 (c)(1),
(2), (4) Date: Mar. 22, 2012

(87) PCT Pub. No.: WO2011/047720
PCT Pub. Date: Apr. 28, 2011

(65) Prior Publication Data
US 2012/0185613 A1    Jul. 19, 2012

(51) Int. Cl.
| | |
|---|---|
| *G06F 15/16* | (2006.01) |
| *H04L 29/08* | (2006.01) |
| *H04L 29/12* | (2006.01) |
| *H04W 4/12* | (2009.01) |
| *H04L 29/06* | (2006.01) |
| *H04L 29/14* | (2006.01) |

(52) U.S. Cl.
CPC ........ *H04L 67/141* (2013.01); *H04L 29/12066* (2013.01); *H04L 61/1511* (2013.01); *H04L 65/1006* (2013.01); *H04L 65/1073* (2013.01); *H04L 67/1002* (2013.01); *H04L 69/40* (2013.01); *H04W 4/12* (2013.01)

(58) Field of Classification Search
CPC ............ H04L 61/1511; H04L 65/1016; H04L 65/1046; H04L 65/105; H04L 65/1073; H04L 65/1069; H04L 67/1004
USPC .......... 370/328, 352; 455/435.1; 709/227, 228
See application file for complete search history.

(56) References Cited

U.S. PATENT DOCUMENTS

| | | | |
|---|---|---|---|
| 2004/0185848 A1* | 9/2004 | Phan-Anh et al. | ......... 455/435.1 |
| 2005/0120198 A1* | 6/2005 | Bajko et al. | ................... 713/150 |
| 2005/0159156 A1 | 7/2005 | Bajko et al. | |
| 2005/0176428 A1* | 8/2005 | Gabor et al. | ............... 455/435.1 |
| 2006/0174009 A1* | 8/2006 | Martiquet et al. | ............. 709/227 |
| 2008/0056234 A1* | 3/2008 | Sprague | ........................ 370/352 |
| 2008/0144605 A1* | 6/2008 | Qiu et al. | ....................... 370/352 |
| 2009/0031032 A1 | 1/2009 | Shanmugham | |

(Continued)

OTHER PUBLICATIONS

Rosenberg Dynamicsoft H Schulzrinne Columbia U J: "Session Initiation Protocol (SIP): Locating SIP Servers; rfc3263.txt", IETF Standard, Internet Engineering Task Force, IETF, CH, Jun. 1, 2002 XP015009041 ISSN: 0000-0003, pp. 1-12.

*Primary Examiner* — Dustin Nguyen
(74) *Attorney, Agent, or Firm* — Coats & Bennett, PLLC (57) ABSTRACT

Method of transferring a message in a Session Initiation Protocol based communications network, from a first node to a third node via a second node. The method comprises the steps of: storing, in a repository associated with the first node, a group identifier associated with a plurality of second nodes; deriving, by the first node, on the basis of the group identifier a network address corresponding to one second node of the plurality of second nodes; and transmitting the message to the third node via the second node derived by the first node.

6 Claims, 6 Drawing Sheets

(56) References Cited

U.S. PATENT DOCUMENTS

2010/0208648 A1* 8/2010 Narkar et al. ............... 370/328

2012/0042084 A1* 2/2012 Dutta et al. ......... H04L 65/1016
709/228

* cited by examiner

METHOD AND SYSTEM OF TRANSFERRING A MESSAGE IN A SESSION INITIATION PROTOCOL BASED COMMUNICATIONS NETWORK

TECHNICAL FIELD

The invention relates to Methods of transferring a message in a Session Initiation Protocol (SIP) based communications network in general. More in particular the invention relates to an Internet Protocol (IP) Multimedia Subsystem (IMS) network.

BACKGROUND

Voice Over Internet Protocol (VOIP) networks, notably Internet Protocol (IP) Multimedia Subsystem (IMS) networks as defined by the $3^{rd}$ Generation Partnership Project (3GPP), are designed around a set of functional entities, within this document also referred to as nodes, each performing particular tasks.

Most of the nodes in a VOIP network, such as an IMS network, are deployed in redundant or geographically distributed method, as is common in telecommunication networks. Reasons include: load sharing (e.g. due to the number of subscribers in the network or due to the call density), geographic distribution (e.g. because of the size of the geographical area to cover) and reliability (e.g. switching over to another node in the case of temporary node outage/link failure or in the case of node maintenance). E.g. when a Serving Call Session Control Function (S-CSCF) entity is temporarily not operational, due to failure or due to planned maintenance, subscribers may be registered in another S-CSCF which will take over the tasks of the inoperational S-CSCF. Likewise, when a P-CSCF is temporarily not operational, the subscriber would have to register with another P-CSCF.

In one known embodiment, the Home Subscriber Server HSS accepts a request for subscription data from one S-CSCF, whilst the HSS has marked the subscriber as currently being registered with another S-CSCF.

In another known embodiment, frequent re-registrations are applied. Re-registrations are needed to keep a binding between a public user identity and a contact address (or simply 'binding') in S-CSCF alive. When a Session Initiation Protocol User Agent (SIP-UA) performs re-registration, the registration-related data in the IMS network is (re-)synchronized at that moment. If due to network problems the subscriber's registration had to be moved to another S-CSCF, then resulting from the re-registration, the SIP-UA, P-CSCF, S-CSCF and HSS are again synchronized. By configuring the S-CSCF to instruct a SIP-UA to apply very frequent re-registrations, the time that a subscriber would be non-contactable due to node outage is minimized, at the expense of increased network signalling, which, in commercial IMS deployments, amounts to a large percentage of the total SIP signalling.

When a P-CSCF becomes inoperational, (regular) re-registration by a SIP-UA would not resolve the problem. The SIP-UA will attempt to register with the same P-CSCF as 'discovered' prior to initial registration.

SUMMARY

The inventor realised that the known VOIP networks, in particular the IMS networks, may be improved. More in general, it is an object of the invention to provide an improved method of transmitting a message in a SIP based network.

According to the invention is provided a method of transferring a message in a Session Initiation Protocol (SIP) based communications network, from a first node to a third node via a second node, comprising the steps of storing, in a repository associated with the first node, a group identifier associated with a plurality of second nodes, deriving, by the first node, on the basis of the group identifier a network address corresponding to one second node of the plurality of second nodes, and transmitting the message to the third node via the second node derived by the first node.

Thus, the first node is not obliged to send the message to the third node via one predetermined second node, but the first node may derive, e.g. select, one of a plurality of second nodes.

The present invention may result in improved network robustness. Specifically, it may remove the necessity for a SIP subscriber to remain registered with a particular Proxy Call Session Control Function (P-CSCF) entity as second node and/or with a particular Serving Call Session Control Function (S-CSCF) entity as second node. Node failure in a P-CSCF entity or S-CSCF entity will be handled by another P-CSCF entity or S-CSCF entity taking over responsibility for new SIP sessions, for new SIP transactions or for SIP response messages. Shared user data within a group of P-CSCF entities and within a group of S-CSCF entities may facilitate above-referred taking over.

Thereto, it is possible that the method comprises synchronising among the plurality of second nodes, data relating to the first and/or third node, e.g. data relating to a relationship between the first and the second node and/or between the third and the second node, such as user data. Thus, each second node of the plurality of second nodes possesses up-to-date data while forwarding the message received from the first node towards the third node. When a second node commences the processing of a message, all second nodes within the group may have up-to-date data. When the processing of the message results in change of data, then the data could be synchronised with, e.g. transmitted to, the other second nodes prior to forwarding the message.

It is possible that the step of deriving comprises performing a Domain Name Server (DNS) query on the basis of the group identifier. The DNS may for example return a list of Internet Protocol (IP) addresses corresponding to the second nodes of the plurality of second nodes. The first node may then select one of the IP addresses.

It is possible that the message contains the group identifier, and the method further comprising the steps of deriving, by the third node, on the basis of the group identifier a network address corresponding to one second node of the plurality of second nodes, and transmitting, in response to receiving the message, a response from the third node to the first node via a second node selected by the third node. The first node or the second node may enter the group identifier in the message, e.g. in a header of the message. Thus, the group identifier may be distributed from the first node or second node to the third node. It will be appreciated that the response may be transmitted via a different second node than the message.

It is possible that the plurality of second nodes is a plurality of user-to-network proxy entities. The plurality of second nodes may be a plurality of Proxy Call Session Control Function (P-CSCF) entities. The group identifier may then be stored in a repository associated with a user equipment, for instance a Session Initiation Protocol User Agent (SIP-UA). The SIP-UA may then transmit the message to e.g. a Serving Call Session Control Function (S-CSCF) entity via one of the plurality of P-CSCF entities. It will be appreciated that herein the user equipment is also referred to as a node.

It is possible that the plurality of second nodes is a plurality of registrars or service nodes. The plurality of second nodes may be a plurality of S-CSCF entities. The group identifier may then e.g. be stored in a repository associated with a user-to-network proxy, such as a P-CSCF entity or in a repository associated with the SIP-UA). The P-CSCF entity may then transmit the message to a recipient via one of the plurality of S-CSCF entities.

The invention also relates to a method of performing a Session Initiation Protocol (SIP) session in an Internet Protocol Multimedia Subsystem (IMS) communications network, between a User Agent (UA) and a node, via a selected Proxy Call Session Control Function (P-CSCF) entity and a selected Serving Call Session Control Function (S-CSCF) entity, comprising the steps of storing, in a repository associated with the User agent (UA), a first group identifier associated with a plurality of Proxy Call Session Control Function (P-CSCF) entities, and selecting on the basis of the first group identifier a network address corresponding to one P-CSCF entity of the plurality of P-CSCF entities, and/or storing in a repository associated with the User agent (UA) or the selected P-CSCF entity, a second group identifier associated with a plurality of Serving Call Session Control Function (S-CSCF) entities, and selecting on the basis of the second group identifier a network address corresponding to one S-CSCF entity of the plurality of S-CSCF entities, and transmitting a message to the node via the selected P-CSCF entity and the selected S-CSCF entity. Thus, the message may be transmitted from the User Agent to the node via any one of the P-CSCF entities of the plurality of P-CSCF entities, and/or via any one of the S-CSCF entities of the plurality of S-CSCF entities.

It is possible that the selected P-CSCF entity of the plurality of P-CSCF entities is used throughout the SIP session. It is also possible that the selected S-CSCF entity of the plurality of S-CSCF entities is used throughout the SIP session. It is also possible that a P-CSCF entity is selected per transaction within the SIP session. It is also possible that a S-CSCF entity is selected per transaction within the SIP session. It is also possible that a P-CSCF entity is selected per message within a single transaction within the SIP session. It is also possible that a S-CSCF entity is selected per message within a single transaction within the SIP session.

It is possible that the selected P-CSCF entity of the plurality of P-CSCF entities synchronises subscriber data stored in a repository associated with that selected P-CSCF entity to the remaining P-CSCF entities of the plurality of P-CSCF entities, and/or the selected S-CSCF entity of the plurality of S-CSCF entities synchronises subscriber data stored in a repository associated with that selected S-CSCF entity to the remaining S-CSCF entities of the plurality of S-CSCF entities.

It will be appreciated that if the selected P-CSCF entity of the plurality of P-CSCF entities is selected for a shorter duration, e.g. per transaction, the frequency of synchronisation may increase, but the sensitivity to node failure decreases.

It is possible that the message comprises the first group identifier and/or the second group identifier, for instance in a Via header and/or a Record-route header.

In an embodiment, a response to the message, within the context of a single transaction, is transmitted from the node to the User Agent, via a selected Proxy Call Session Control Function (P-CSCF) entity and a selected Serving Call Session Control Function (S-CSCF) entity, wherein the method further comprises selecting, e.g. by the node, on the basis of the first group identifier a network address corresponding to one P-CSCF entity of the plurality of P-CSCF entities, and/or selecting, e.g. by the node or by the P-CSCF entity, on the basis of the second group identifier a network address corresponding to one S-CSCF entity of the plurality of S-CSCF entities. Hence, the response may also be transmitted via any one of the P-CSCF entities of the plurality of P-CSCF entities, and/or via any one of the S-CSCF entities of the plurality of S-CSCF entities.

The invention also relates to a SIP based communications network, comprising a first node, a second node and a third node, wherein the first node has a repository associated therewith, the repository comprising a group identifier associated with a plurality of second nodes, wherein the first node is arranged for deriving, on the basis of the group identifier, a network address corresponding to one second node of the plurality of second nodes, and wherein the network is arranged for transmitting a message to the third node via the selected second node.

In the event that the SIP based communications network is an Internet Protocol Multimedia Subsystem (IMS) communications network, the first node may for instance be a User Agent. Then the third node may be a recipient node. Also, the plurality of second nodes may be a plurality of P-CSCF entities or a plurality of S-CSCF entities. It is also possible that the plurality of second nodes comprises two or more groups of second nodes, such as a plurality of P-CSCF entities and a plurality of S-CSCF entities, wherein the message may be transmitted from the first node to a second node of one group, then to a second node of another group, and then to the third node.

The invention also relates to an Internet Protocol Multimedia Subsystem (IMS) communications network comprising a User Agent (UA), a selected Proxy Call Session Control Function (P-CSCF) entity, a selected Serving Call Session Control Function (S-CSCF) entity and a recipient node, wherein the User Agent has a repository associated therewith, storing a first group identifier associated with a plurality of Proxy Call Session Control Function (P-CSCF) entities, and/or a second group identifier associated with a plurality of Serving Call Session Control Function (S-CSCF) entities, wherein the User Agent is arranged for selecting on the basis of the first group identifier a network address associated with one P-CSCF entity of the plurality of P-CSCF entities, and/or wherein the User Agent or the selected P-CSCF entity is arranged for selecting on the basis of the second group identifier a network address associated with one S-CSCF entity of the plurality of S-CSCF entities, and wherein the network is arranged for transmitting a message to the recipient node via the selected P-CSCF entity and the selected S-CSCF entity.

Optionally, the plurality of P-CSCF entities is arranged for synchronising subscriber data among the plurality of P-CSCF entities. It is also possible that the plurality of S-CSCF entities is arranged for synchronising subscriber data among the plurality of S-CSCF entities.

The invention also relates to a network node for transmitting a message to a recipient node via an intermediate node in a Session Initiation Protocol, SIP, based communications network, wherein the node has a repository associated therewith arranged for comprising a group identifier associated with a plurality of intermediate nodes, wherein the node is arranged for deriving, e.g. selecting, on the basis of the group identifier, a network address corresponding to one intermediate node of the plurality of intermediate nodes; and wherein the node is arranged for transmitting a message to the recipient node via the intermediate node derived by the node. Such network node may for instance be a User Agent, e.g. a user equipment, or a P-CSCF entity.

The invention also relates to a network node for receiving a message from a transmitting node and forwarding the message to a recipient node in a Session Initiation Protocol, SIP, based communications network, wherein the node has a repository associated therewith arranged for comprising a group identifier associated with a plurality of such nodes, wherein the node is arranged for synchronising subscriber data among the plurality of intermediate nodes. Such node may for instance be a P-CSCF entity or a S-CSCF entity.

The invention also relates to a Session Initiation Protocol message in an Internet Protocol Multimedia Subsystem network, comprising a group identifier associated with a plurality of Proxy Call Session Control Function entities, for instance in a Via header and/or a Record-route header, and/or a group identifier associated with a plurality of Serving Call Session Control Function entities, for instance in a Via header and/or a Record-route header.

BRIEF DESCRIPTION OF THE DRAWINGS

The invention will now be further elucidated by means of non-limiting examples referring to the drawing, in which.

DETAILED DESCRIPTION

Voice Over Internet Protocol (VOIP) networks, notably Internet Protocol (IP) Multimedia Subsystem (IMS) networks as defined by the $3^{rd}$ Generation Partnership Project (3GPP), are designed around a set of functional entities, also referred to as nodes herein, each performing particular tasks. These nodes can be used in both prior art networks and in a network according to the invention.

Below is given a (non-exhaustive) list of typical nodes in a Voice Over IP network. Also is described their usual use in prior art networks.

User-to-network proxy entity; the user-to-network proxy entity is functionally connected between a user equipment and the IMS network; it resides at the edge of the IMS network. Between the user-to-network proxy entity and the user equipment, resides the Access Network. Some of the tasks of the user-to-network proxy entity include: ensuring integrity of signalling messages arriving from the user equipment or being sent to the user equipment, asserting data received from the user equipment, applying signalling encryption and signalling compression (e.g. for wireless connections) for data connection with the user equipment.

Registrar; when a VOIP subscriber registers as user in the VOIP network, she deposits her public user identity and her contact address, typically an Internet Protocol (IP) address (optionally with a user part), in the registrar. This enables calls being established towards that VOIP user, i.e. towards that public user identity, to be offered to this user's user equipment. The registrar resides in the IP network (sub-network) of the VOIP operator. The combination of public user identity and contact address is known as a binding. The registration procedure may include authentication.

Inbound proxy; when a call is established towards a VOIP subscriber, the call will enter the VOIP network via the inbound proxy. The inbound proxy queries a Location server to get an indication of the registrar that holds the binding of this subscriber. The inbound proxy is also used to obtain the address of the registrar that shall be used for subscriber registration.

Location server; the location server keeps track of the registrar in which a subscriber is registered. The selection of registrar is done by the VOIP network, not by the user.

Network-to-network proxy entity; when a VOIP call is established that breaks out to or breaks in from another network, then the signalling traverses a network-to-network proxy entity. If the other network uses another signalling protocol, e.g. ISDN User Part (ISUP) for the Integrated Services Digital Network (ISDN), then the network-to-network proxy has to perform signalling conversion. For breaking out from VOIP network to another VOIP/non-VOIP network, a 'gateway selector' may be used; this gateway selector selects the Network-to-network proxy entity or gateway to be used for the breakout.

The above-described nodes for the VOIP network form part of the Control plane, which handles signalling for subscriber registration, the establishment of calls and other tasks. Besides control plane nodes, the VOIP network contains nodes that form part of the User plane. The User plane carries the media for a call, e.g. Pulse Code Modulation (PCM (ITU-T G.711)) encoded voice.

A signalling protocol commonly used in contemporary VOIP networks is the Session Initiation Protocol (SIP). SIP is defined by the Internet engineering task force (IETF; www.ietf.org) and is published in RFC 3261 (RFC=Request for comments; is a naming convention for IETF standards). Many extensions and enhancements to SIP are introduced, each described in a separate IETF RFC. For carrying voice and other real-time media such as video over the user plane, the Real-time Transport Protocol (RTP) may be used, which is published in RFC 3550. Besides SIP and RTP, Diameter protocol is used between designated nodes in the VOIP network, for various processes, such as registration and terminating call establishment. Diameter base protocol is published in RFC 3588.

The IP Multimedia Subsystem (IMS) has adopted various protocols from IETF, such as SIP, RTP and Diameter. The architecture of an IMS network includes nodes that resemble the nodes that were described for the VOIP network, such as (list is not exhaustive):

SIP user agent (SIP-UA). The SIP-UA is the user equipment, such as a mobile communications device or a wireline communications device.

Proxy Call Session Control Function (P-CSCF) entity. The P-CSCF entity serves as user-to-network proxy entity. A subscriber is assigned to a P-CSCF during IMS registration. Hereto, the subscriber (the user equipment) 'discovers' a P-CSCF entity during registration. Various methods are defined for the subscriber to discover his P-CSCF. The selection of P-CSCF may e.g. be done by Dynamic Host Configuration Protocol (DHCP) associated with the Access Network or may be set manually in the user equipment, e.g. by the user. Once a subscriber is registered with a particular user equipment in the IMS network, all call related signalling between this subscriber user equipment and network has to traverse that particular proxy entity, i.e. the P-CSCF.

Serving Call Session Control Function (S-CSCF) entity. The S-CSCF entity performs the role of registrar. The subscriber places his contact address, e.g. IP address, in a repository associated with the S-CSCF entity, enabling the S-CSCF entity to forward an incoming call to that subscriber. The S-CSCF entity also acts as Service Node. When a call is established from or to an IMS subscriber, the call signalling traverses the S-CSCF entity. The S-CSCF entity may then apply services for this call from/to the subscriber. These services may be performed in the S-CSCF entity or in an external node, such as a SIP Application Server (SIP-AS). As the subscriber will be registered with a particular S-CSCF entity, all call related signalling to/from the end-user has to be handled by this particular S-CSCF entity.

Interrogating Call Session Control Function (I-CSCF) entity. The I-CSCF entity is the inbound proxy for the IMS network. When a call enters the IMS network, the I-CSCF entity queries a Home Subscriber Server (HSS) to obtain the address of the S-CSCF entity where the subscriber is registered, i.e. which holds the subscribers binding (contact address). In addition, when a subscriber registers in the IMS network, the I-CSCF entity assists in sending the registration message to an appropriate S-CSCF entity (if not already registered) or to the currently used S-CSCF entity (if already registered). I-CSCF does not hold subscriber data.

Home Subscriber Server (HSS). The HSS holds subscriber records, containing IMS subscription data. When a subscriber registers in the IMS network, the HSS is updated as to which S-CSCF entity is now holding the subscriber's binding. The HSS will, in turn, provide IMS subscription data to the S-CSCF entity. Some of this subscription data may be forwarded from the S-CSCF entity to the P-CSCF entity. And some of that data may be forwarded further from the P-CSCF entity to the user equipment.

Interconnect Border Control Function (IBCF) entity. The IBCF entity interconnects two IMS networks. In that role, it may perform tasks such as protocol adaptation (e.g. IPv4-IPv6), service restriction, resource usage restriction (bandwidth control), topology hiding (shielding IP addresses and host names) and interconnect/transit accounting. The IBCF entity does not hold subscriber data.

Media Gateway Control Function (MGCF) entity. The MGCF entity performs signalling connection between the IMS network and Circuit switched (CS) networks, such as ISDN or GSM. The MGCF entity does not hold subscriber data.

Most of the nodes in a VOIP network, such as an IMS network, are deployed in redundant or geographically distributed method, as is common in telecommunication networks. Reasons include: load sharing (e.g. due to the number of subscribers in the network or due to the call density), geographic distribution (e.g. because of the size of the geographical area to cover) and reliability (e.g. switching over to another node in the case of temporary node outage/link failure or e.g. in the case of node maintenance).

As described above, a subscriber will be registered in the prior art IMS network through a particular P-CSCF entity and will be registered in a particular S-CSCF entity. Hence, in order to guarantee correct handling of services in the network, it is required that nodes in the IMS network remain synchronized. One node needs to know which other node is holding subscriber data related to the same subscriber. One can visualize this by depicting registration relationships in the prior art IMS network. These relationships are static, not related to communication activity at any moment. The following registration relationships may be defined:

(1) Between SIP-UA and P-CSCF Entity

The SIP-UA stores the network address of the P-CSCF entity (resulting from P-CSCF discovery procedure), and possibly security association related data and/or signalling compression related data;

The P-CSCF entity stores the public identity of the SIP-UA (as received from the SIP-UA), and possibly security association related data and/or signalling compression related data.

(2) Between SIP-UA and S-CSCF Entity

The SIP-UA stores the S-CSCF network address (also referred to as 'Service-route'), as received from the S-CSCF entity in a SIP 200 Ok response to a SIP Register request;

The S-CSCF entity stores the contact address of the SIP-UA, as well as terminal capabilities, if applicable, both as received from the SIP-UA in the SIP Register request.

(3) Between SIP-UA and HSS

The SIP-UA stores subscription data of the subscriber, received from the HSS, via the S-CSCF entity and the P-CSCF entity, such as a list of Public user identities that may be used by this SIP-UA for establishing and receiving calls. The HSS does not store data received from the SIP-UA, so that the relation between the SIP-UA and HSS is unidirectional.

(4) Between P-CSCF and S-CSCF

The P-CSCF entity stores the S-CSCF entity network address ('Service-route'), as received from the S-CSCF entity;

The S-CSCF entity stores the P-CSCF entity network address (also referred to as 'Path'), as received from the P-CSCF entity.

(5) Between P-CSCF and HSS

The P-CSCF entity stores subscription data of the subscriber received from the HSS, via the S-CSCF entity, such as charging parameters or the aforementioned list of Public user identities. The HSS does not store data received from the P-CSCF entity, so that the relation between the P-CSCF entity and the HSS is unidirectional.

(6) Between S-CSCF and HSS

The S-CSCF entity stores subscriber subscription data, received from the HSS. The S-CSCF entity does not store the HSS address.

The HSS stores the network address of the S-CSCF entity.

Next, an example of a network according to the invention will be described. It will be appreciated that the network according to the invention in certain aspects relies on the above described relationships between nodes in the prior art network.

Figure 1:
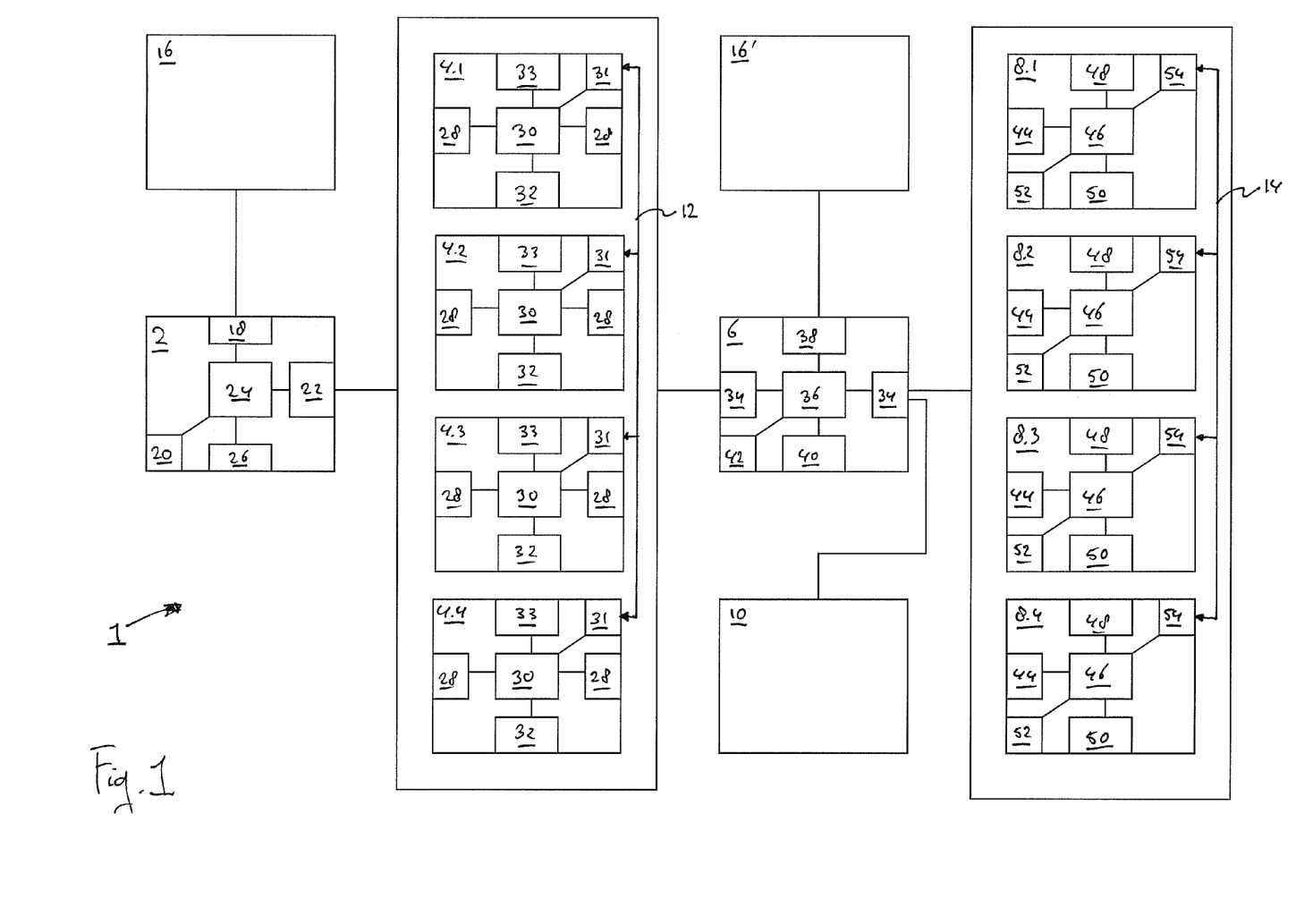
FIG. 1 shows an example of a schematic representation of a network according to the invention.

FIG. 1 shows an example of a network 1 according to the invention. In this example, the network comprises a Session Initiation Protocol User Agent (SIP-UA) 2, a plurality of Proxy Call Session Control Function (P-CSCF) entities 4.$i$ ($i$=1, 2, 3, . . . ), an Interrogating Call Session Control Function (I-CSCF) entity 6 and a plurality of Serving Call Session Control Function (S-CSCF) entities 8.$j$ ($j$=1, 2, 3, . . . ). In this example, the network also comprises a Home Subscriber Server (HSS) 10.

In this example, the SIP-UA 2 comprises retrieving means 18, a repository 20, input/output means 22, control means 24 and selection means 26. In this example, the P-CSCF entities 4.$i$ each comprise input/output means 28, control means 30, distribution means 31, retrieving means 33, and optionally a repository 32. In this example, the I-CSCF entity 6 comprises input/output means 34, control means 36, retrieving means 38, optional selection means 40 and a repository 42. In this example, the S-CSCF entities 8.j each comprise input/output means 44, control means 46, retrieving means 48, selection means 50, a repository 52 and distribution means 54.

In this example, for registration the SIP-UA 2 does not discover a single P-CSCF entity network address, but instead discovers a P-CSCF group identifier. The P-CSCF group identifier is associated with the plurality of P-CSCF entities 4.i. The P-CSCF group identifier may for instance be a domain name.

The actual registration process of the IMS subscriber (SIP-UA) is done through a selected one P-CSCF entity of the plurality of P-CSCF entities 4.i. In this example, the SIP-UA contacts a Domain Name Server (DNS) 16 for retrieving a network address corresponding to the selected P-CSCF entity. Thereto, the SIP-UA may use the retrieving means 18. Here DNS name resolving of the P-CSCF group identifier by the SIP-UA yields the network address, e.g. IP address, of one particular P-CSCF through which the registration shall be done. This particular P-CSCF is used for the registration process. It will be appreciated that the SIP-UA now has derived the network address of one P-CSCF entity of the plurality of P-CSCF entities on the basis of the P-CSCF group identifier. It will be appreciated that DNS may return multiple network addresses, e.g. multiple IP addresses, related to multiple P-CSCF entities of the plurality of P-CSCF entities 4.i. The SIP-UA 2 may in such case select one network address for the registration process using the selection means 26. It will be appreciated that the SIP-UA now has selected the network address of one P-CSCF entity of the plurality of P-CSCF entities on the basis of the P-CSCF group identifier.

Regular IP address usage may be applied here, entailing that when the sending of the SIP registration message to one IP address fails (because the P-CSCF related to that IP address is not operational at that moment), the SIP-UA may attempt to send the SIP registration message to another IP address. Such method to try a second IP address in the case that the first IP address fails, is standard IP methodology, known in the art.

It will be appreciated that the DNS 16 may apply a rule when returning multiple network addresses as a response to a P-CSCF group identifier. The DNS may for instance return a list of network addresses, the order of which is adjusted for present load of the P-CSCF entities associated with the network addresses in the list. Alternatively, the DNS 16 may vary, e.g. cycle, the order of the addresses in the list. This may be useful in that nodes often simply use the first address of the list of addresses returned. Alternatively, or additionally, the DNS may append a weight factor to each address returned, for e.g. reflecting the current load for these nodes.

The Path header that the P-CSCF entity includes in the SIP Register may be the P-CSCF group identifier. The selected P-CSCF entity 4.i forwards the Registration message to an I-CSCF entity 6 which selects a S-CSCF entity 8.j, as in prior art networks. In this example, the I-CSCF entity selects a S-CSCF group identifier for this subscriber, rather than the address (host name) of a single S-CSCF entity. The S-CSCF group identifier is associated with the plurality of S-CSCF entities 8.j.

The actual registration process is done through a selected S-CSCF entity of the plurality of S-CSCF entities 8.j. In this example, DNS name resolving by the selected I-CSCF entity, yields the network address of the selected S-CSCF entity of the plurality of S-CSCF entities 8.j through which the registration shall be done. It will be appreciated that the DNS 16' queried by the I-CSCF entity may be the same DNS as queried by the SIP-UA, or another DNS. It will be appreciated that DNS may return multiple network addresses, e.g. multiple IP addresses, related to multiple S-CSCF entities of the plurality of S-CSCF entities. The I-CSCF entity may select one IP address using the selection means 40. If the selected S-CSCF entity is not operational, the I-CSCF entity may try to send the SIP Registration message to another S-CSCF entity of the plurality of S-CSCF entities, of which it may also have received the IP address from DNS. It will further be appreciated that the I-CSCF entity may have cached, in the repository 42, the IP addresses of the S-CSCF entities within the plurality of S-CSCF entities. So long as the validity period of these addresses has not expired, the I-CSCF entity would not have to perform a DNS query.

The selected P-CSCF entity receives a Service-route from the selected S-CSCF entity, in the 200 Ok message. This Service-route may be a group Service-route, rather than a Service-route related to a single S-CSCF entity. The Service-route may comprise the S-CSCF group identifier. The P-CSCF entity may store this group Service-route.

In this example, the SIP-UA 2 stores the (discovered) P-CSCF group identifier in the repository 20 and uses that every time it initiates a SIP session towards the network or initiates a stand-alone transaction. Similarly, the SIP-UA stores the S-CSCF group identifier that it receives in the 200 Ok for the registration in the repository 20. Each SIP session establishment or stand-alone transaction may be done through a different P-CSCF entity within the plurality of P-CSCF entities 4.i and through a different S-CSCF entity within the plurality of S-CSCF entities 8.j.

In a preferred embodiment, the data related to (a) the relation between the selected P-CSCF entity and the SIP-UA, (b) the relation between the selected P-CSCF entity and the selected S-CSCF entity and/or (c) the relation between the selected P-CSCF entity and the HSS is not kept solely within the selected P-CSCF entity through which the registration is done, but is distributed within the plurality of P-CSCF entities. Thereto, the P-CSCF entities 4.i may use the distribution means 31. Resulting from this data distribution, SIP session establishment and stand-alone SIP transactions may be done through any of the P-CSCF entities of the plurality of P-CSCF entities.

Data synchronisation between the P-CSCF entities is schematically depicted in FIG. 1 by arrow 12.

In a preferred embodiment, the data related to (a) the relation between the selected S-CSCF entity and the SIP-UA, (b) the relation between the selected S-CSCF entity and the selected P-CSCF entity and/or (c) the relation between the selected S-CSCF entity and the HSS is not kept solely within the selected S-CSCF through which the registration is done, but is distributed within the plurality of S-CSCF entities. Thereto, the S-CSCF entities 8.j may use the distribution means 54. Resulting from this data distribution, SIP session establishment and stand-alone SIP transactions may be done through any of the S-CSCF entities within the plurality of S-CSCF entities.

Data synchronisation between the S-CSCF entities is schematically depicted in FIG. 1 by arrow 14.

In this example, the HSS 10 stores the S-CSCF group identifier, which it receives from the selected S-CSCF entity through which the subscriber has done registration. When the HSS has to steer a SIP Invite request message or a SIP Register request message to a S-CSCF entity, the SIP Invite or SIP Register will be sent to any of the S-CSCF entities in the plurality of S-CSCF entities.

When the HSS has to update the subscriber data stored in the S-CSCF entity repository 52, it may perform the updating towards any of the S-CSCF entities within the group of S-CSCF entities allocated to this subscriber. The S-CSCF entity receiving the updated data takes care that the updated data is distributed within the plurality of S-CSCF entities using the distribution means 54.

Resulting from the registration method as described above, the relationships in the IMS network for a particular subscriber will be as follows.

The SIP-UA has a relation with a plurality of P-CSCF entities (by virtue of storing the P-CSCF group identifier in the repository 20) as well as a relation with a plurality of S-CSCF entities (by virtue of storing the S-CSCF group identifier in the repository 20). A SIP session or stand-alone transaction initiated by the SIP-UA may be established through any of the P-CSCF entities and any one of the S-CSCF entities within their respective plurality. It is noted that security and compression related data stored by the SIP-UA, needed for the data connection with a P-CSCF over (public) internet shall be such that the SIP-UA can communicate (exchange SIP messages) with any one of the P-CSCF entities within the plurality of P-CSCF entities.

Each P-CSCF entity within the plurality of P-CSCF entities has, for this subscriber, a relation with this subscriber's plurality of S-CSCF entities (e.g. by virtue of storing the S-CSCF group identifier, in the repository 32). It is noted that security and compression related data stored by each P-CSCF entity, needed for the data connection with the SIP-UA over (public) internet shall be such that each P-CSCF entity of the plurality of P-CSCF entities can communicate (exchange SIP messages) with the SIP-UA.

Each S-CSCF within the plurality of S-CSCF entities has, for this subscriber, a relation with this subscriber's plurality of P-CSCF entities (e.g. by virtue of storing the P-CSCF group identifier in the repository 52). A SIP session or stand-alone transaction destined for the SIP-UA may be established through any of the S-CSCF entities and any of the P-CSCF entities within their respective plurality.

The HSS maintains, for this subscriber, a relation with this subscriber's plurality of S-CSCF entities (e.g. by virtue of storing the S-CSCF group identifier).

An incoming SIP session or stand-alone transaction as well as subscriber data update may be directed towards any one of the S-CSCF entities in the plurality of S-CSCF entities.

Figure 2:
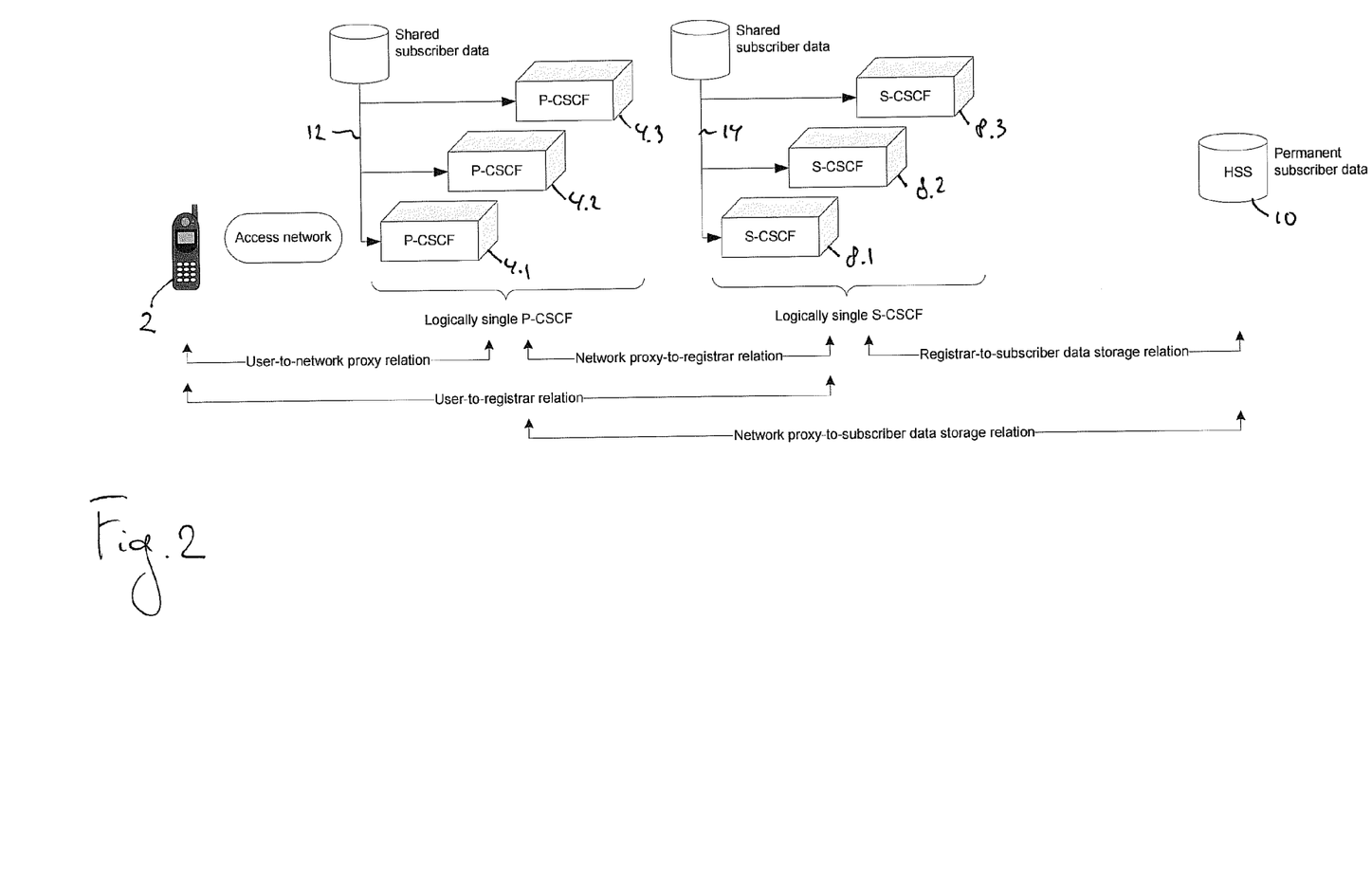
FIG. 2 shows an example of a schematic representation of logical relationships between nodes in an IMS network according to the invention.

FIG. 2 depicts the relationships that may exist after subscriber registration (registration relationships), in accordance with the above registration.

Figure 3:
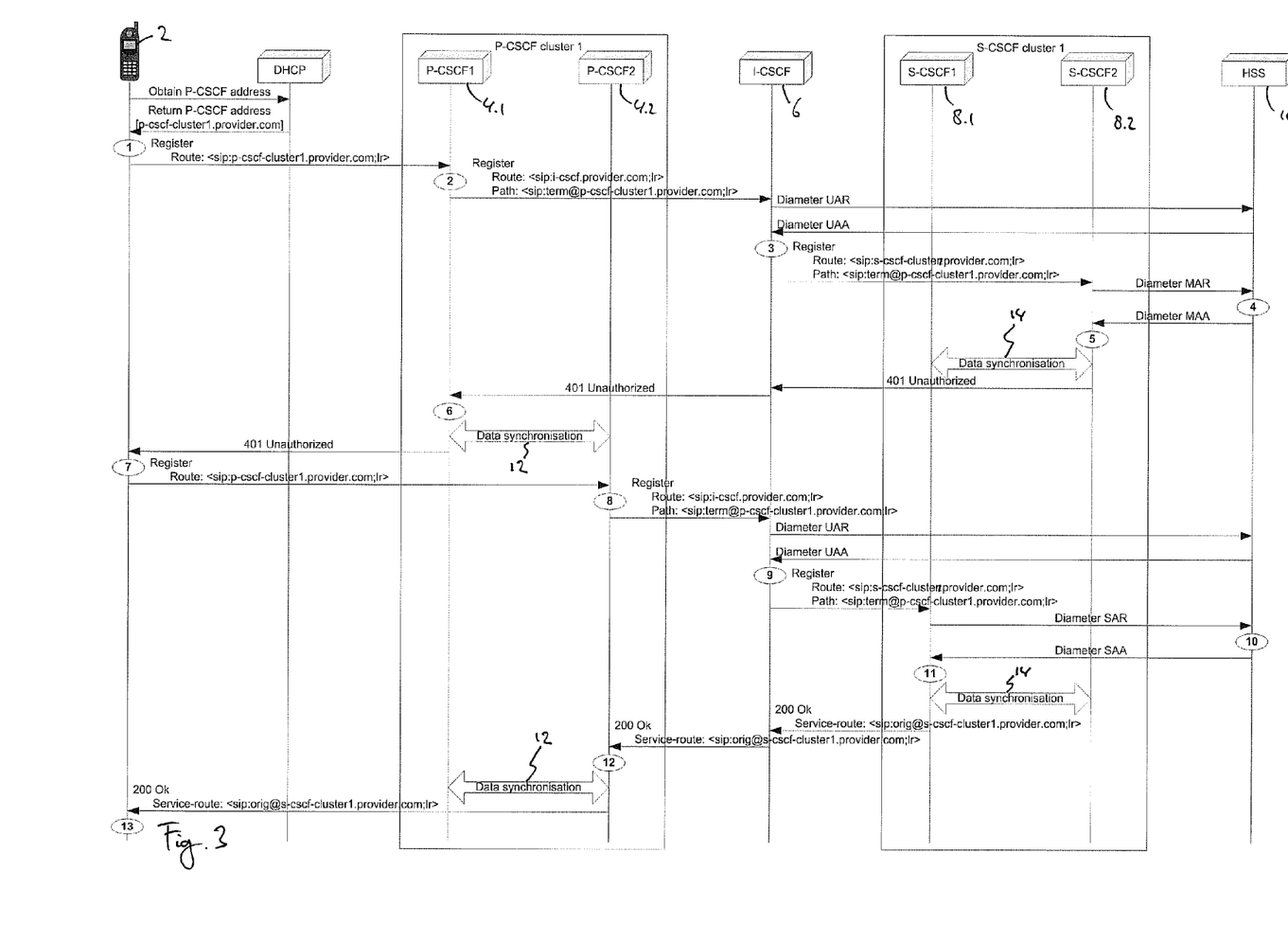
FIG. 3 shows an example of subscriber registration according to the invention.

FIG. 3 shows an example of registration by the SIP-UA, in accordance with the invention. In step (1), the SIP-UA 2 discovers the P-CSCF address being the P-CSCF group identifier (sip:p-cscf-cluster1.provider.com) identifying a group, here identified as cluster 1, of P-CSCF entities and uses it as Route header in SIP Register. The SIP-UA applies DNS resolving (not depicted) and obtains an IP address associated with the P-CSCF group identifier. In this example, the IP address is the IP address of P-CSCF1. The SIP-UA sends a SIP Register towards this IP address.

In step (2), P-CSCF1 recognizes the address in the Route header (sip:p-cscf-cluster1.provider.com) as its own group identifier, so removes this Route header. P-CSCF1 adds the group proxy address as Path header (Path:<sipterm@p-cscf-cluster1.provider.com;lr>).

In step (3), the I-CSCF entity contacts the HSS and receives S-CSCF capabilities. Based on these capabilities, the I-CSCF entity selects the group of S-CSCF entities identified as cluster 1 (sip:s-cscf-cluster1.provider.com) and uses that address as Route header. The I-CSCF entity applies DNS resolving and, in this example retrieves/selects the IP address of S-CSCF2.

In step (4) S-CSCF2 contacts the HSS and receives authorization data. The HSS stores the address, i.e. the group identifier s-cscf-cluster1.provider.com, of the S-CSCF cluster that S-CSCF2 belongs to.

In step (5) S-CSCF2 stores the data received from the HSS. S-CSCF2 then synchronises subscriber data with the other S-CSCF entities within the plurality of S-CSCF entities, in this case with S-CSCF1.

All S-CSCF entities in the plurality of S-CSCF entities are now prepared to receive the second registration message.

In step (6), when P-CSCF1 receives the 401 Unauthorized, it stores data contained in this response and then synchronises subscriber data with the other P-CSCF entities within the plurality of P-CSCF entities, in this case with P-CSCF2.

All P-CSCF entities in the plurality of P-CSCF entities are now prepared to receive the second registration message.

In step (7), the SIP-UA sends the second Register message and uses again sip:p-cscf-cluster1.provider.com as the Route header. This time, DNS resolving leads to sending the SIP Register message to P-CSCF2 (but it could also have been P-CSCF1).

In step (8), P-CSCF2 recognizes the address in the Route header (sip:p-cscf-cluster1.provider.com) as its own group address, so removes this Route header. P-CSCF2 adds the group proxy address as Path header. P-CSCF2 has, due to data synchronization initiated by P-CSCF1, data available for the security relation with the SIP-UA.

In step (9), the I-CSCF entity (which could be another I-CSCF entity than used in the first registration request) contacts the HSS. The HSS informs the I-CSCF entity that the subscriber shall be registered with s-cscf-cluster1.provider.com. DNS resolving by the I-CSCF entity leads to the SIP Register being sent to S-CSCF1 (but it could also have been S-CSCF2). S-CSCF1 has, due to data synchronization initiated by S-CSCF2, data available for authenticating the subscriber. S-CSCF1 informs the HSS about the subscriber assignment.

In step (10), the HSS stores the S-CSCF entity address in the form of the S-CSCF group identifier (s-cscf-cluster1.provider.com) and provides S-CSCF1 with subscription data. The HSS is prepared to direct SIP session establishment requests to any of the S-CSCF entities in the plurality of S-CSCF entities.

In step (11), S-CSCF1 stores the data, as normal, and synchronises subscriber data with the other S-CSCF entities in the plurality of S-CSCF entities, in this case with S-CSCF2. The service-route provided towards the calling party identifies the plurality of S-CSCF entities. All S-CSCF entities in the plurality of S-CSCF entities are now prepared to establish SIP sessions for the subscriber.

In step (12), P-CSCF2 stores the service-route and optionally other subscriber data (e.g. P-associated-URI) and then synchronises subscriber data with the other P-CSCF entities in the plurality of P-CSCF entities, in this case with P-CSCF1. All P-CSCF entities in the plurality of P-CSCF entities are now prepared to establish SIP sessions for this SIP-UA of this subscriber.

In step (13), the SIP-UA receives the 200 Ok and stores the Service-route and other subscriber data. The SIP-UA is now ready to establish and receive SIP sessions through any of the P-CSCF entities in the plurality of P-CSCF entities and through any of the S-CSCF entities in the plurality of S-CSCF entities.

In this example, the distribution of data between logical entities in the IMS network is done through existing SIP signalling methodology. For example, when the SIP-UA registers in the IMS network, it provides its data towards the P-CSCF entity through which the registration is taking place. By virtue of this P-CSCF entity sharing this subscriber data with other P-CSCF entities within the plurality of P-CSCF entities, the SIP-UA is essentially providing its data towards the plurality of P-CSCF entities. This plurality of P-CSCF entities may be considered to constitute a logical P-CSCF entity.

Likewise, data from the SIP-UA is sent to the S-CSCF entity. The SIP message carrying the data from the SIP-UA to the S-CSCF entity traverses the P-CSCF entity (that is to say, the P-CSCF entity that was selected for the registration procedure). The selected P-CSCF entity may add specific data elements to this SIP message, such as Path. By virtue of the S-CSCF entity sharing the subscriber data with other S-CSCF entities in the plurality of S-CSCF entities, the SIP-UA and P-CSCF entity are essentially providing their data towards the plurality of S-CSCF entities. This plurality of S-CSCF entities may be considered to constitute a logical S-CSCF entity.

In similar fashion, the S-CSCF entity stores for this subscriber the address of a logical P-CSCF entity, and the HSS stores for this subscriber the address of a logical S-CSCF entity.

Whenever a SIP session is established or a stand-alone transaction is initiated, the SIP request may be sent via the logical S-CSCF entity for the subscriber and via the logical P-CSCF entity for the subscriber.

Figure 4:
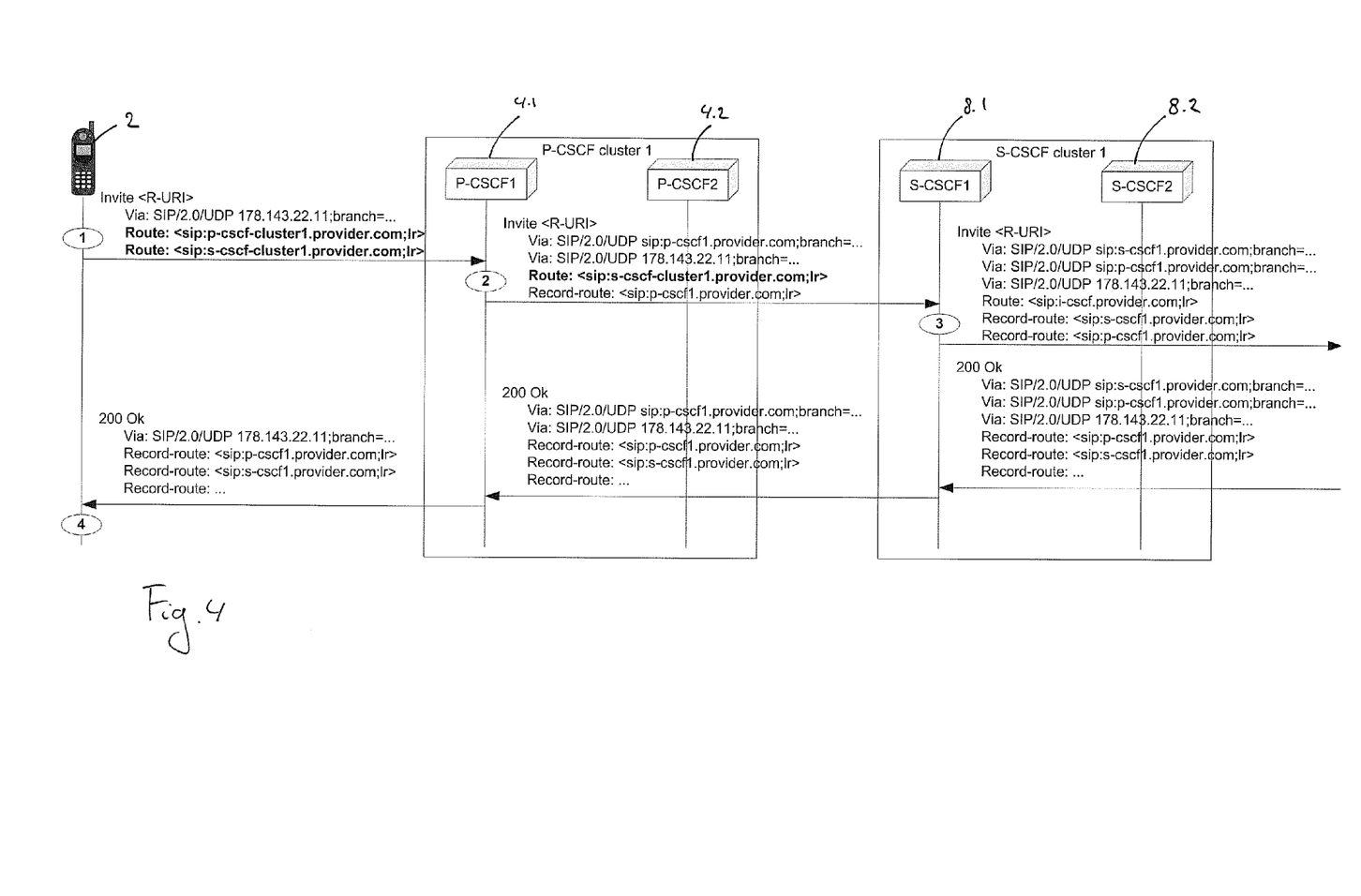
FIG. 4 shows an example of Session establishment by a User Agent according to the invention.

FIG. 4 shows a simplified example of SIP session establishment by the SIP-UA. It is noted that provisional responses are not depicted in this example.

In step (1), the SIP-UA uses the discovered P-CSCF entity address, i.e. the P-CSCF group identifier, and the received service route, i.e. the S-CSCF group identifier, to set the Route headers in the SIP Invite. DNS resolving by the SIP-UA results in the Invite being sent to one P-CSCF entity of the plurality of P-CSCF entities associated with the P-CSCF group identifier, in this example to P-CSCF1.

In step (2), the selected P-CSCF entity uses its own address for the Via header and for the Record-route header. This will have the effect that the remainder of the transaction (Via header) as well as the remainder of the SIP session (Record-route header) run through this P-CSCF entity. DNS resolving by P-CSCF1, using the retrieving means 33, results in the Invite being sent to S-CSCF1, in this example.

In step (3), the selected S-CSCF entity uses its own address for the Via header and for the Record-route header. This will have the effect that the remainder of the transaction as well as the remainder of the SIP session run through this S-CSCF entity.

In step (4), the SIP-UA stores the received Record-route headers for sending subsequent requests within this SIP session, starting with the Ack request.

Figure 5:
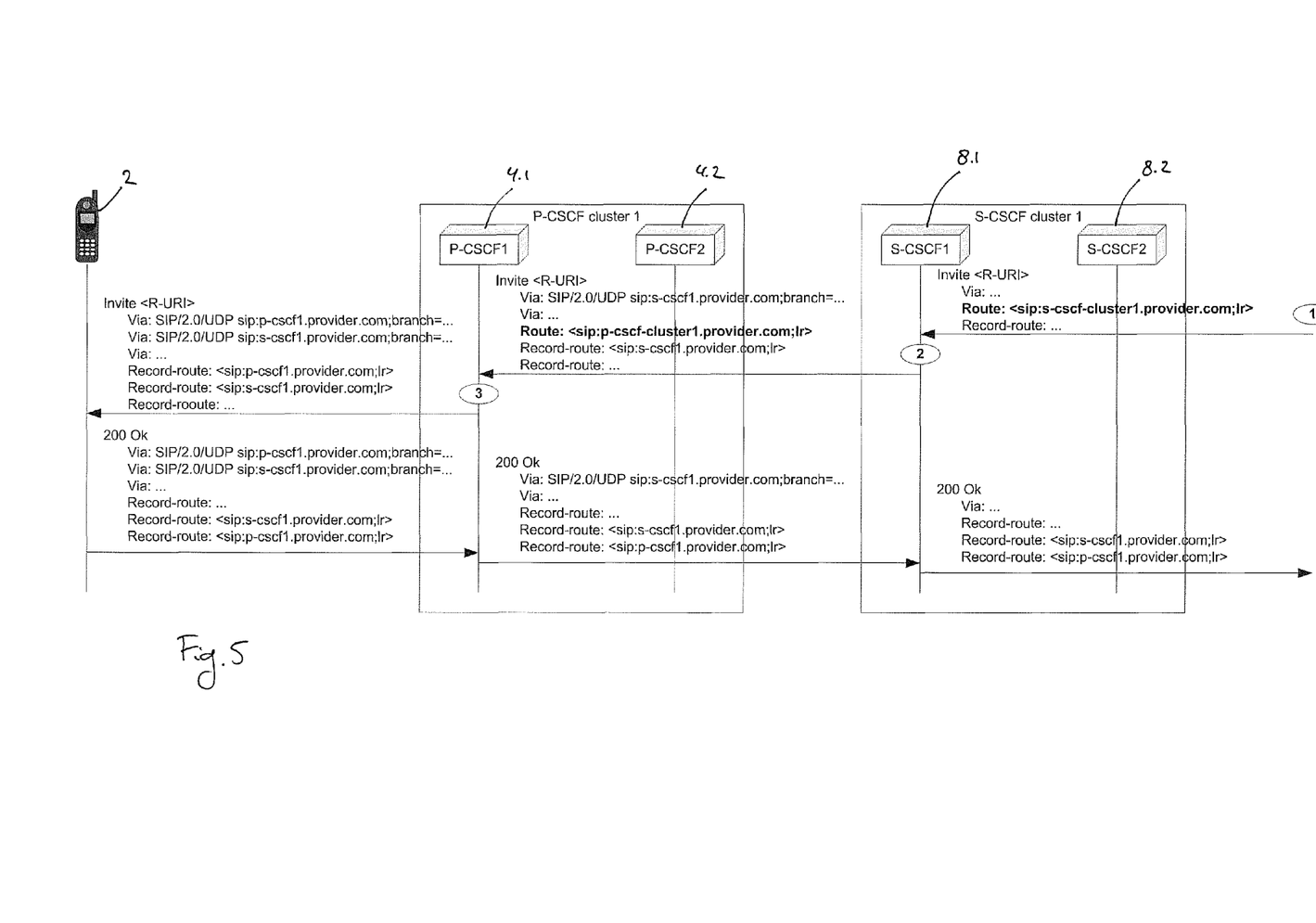
FIG. 5 shows an example of Session establishment towards a User Agent according to the invention.

FIG. 5 shows a simplified example of SIP session establishment towards the SIP-UA. It is noted that provisional responses are not depicted in this example.

In step (1), a SIP session is established towards the S-CSCF entity of the SIP-UA. The address of the S-CSCF entity may e.g. be obtained from the HSS by the I-CSCF entity. In this example, the address will be the S-CSCF group identifier. DNS resolving of the S-CSCF group identifier (in this example by the I-CSCF entity retrieving means 38) results in the Invite being sent to one of the S-CSCF entities of the plurality of S-CSCF entities associated with the S-CSCF group identifier, in this example to S-CSCF1.

In step (2), the selected S-CSCF1 uses its own address for Via header and for Record-route header. The remainder of the transaction and the remainder of the SIP session are routed through this S-CSCF entity. S-CSCF1 uses the stored Path header to set the Route header. DNS resolving of the P-CSCF group identifier (in this example by S-CSCF1 retrieving means 48) results in the Invite being sent to one P-CSCF entity of the plurality of P-CSCF associated with the P-CSCF group identifier, in this example to P-CSCF1.

In step (3), the selected P-CSCF1 uses its own address for Via header and for Record-route header. The remainder of the transaction and the remainder of the SIP session are routed through this P-CSCF.

Figure 6:
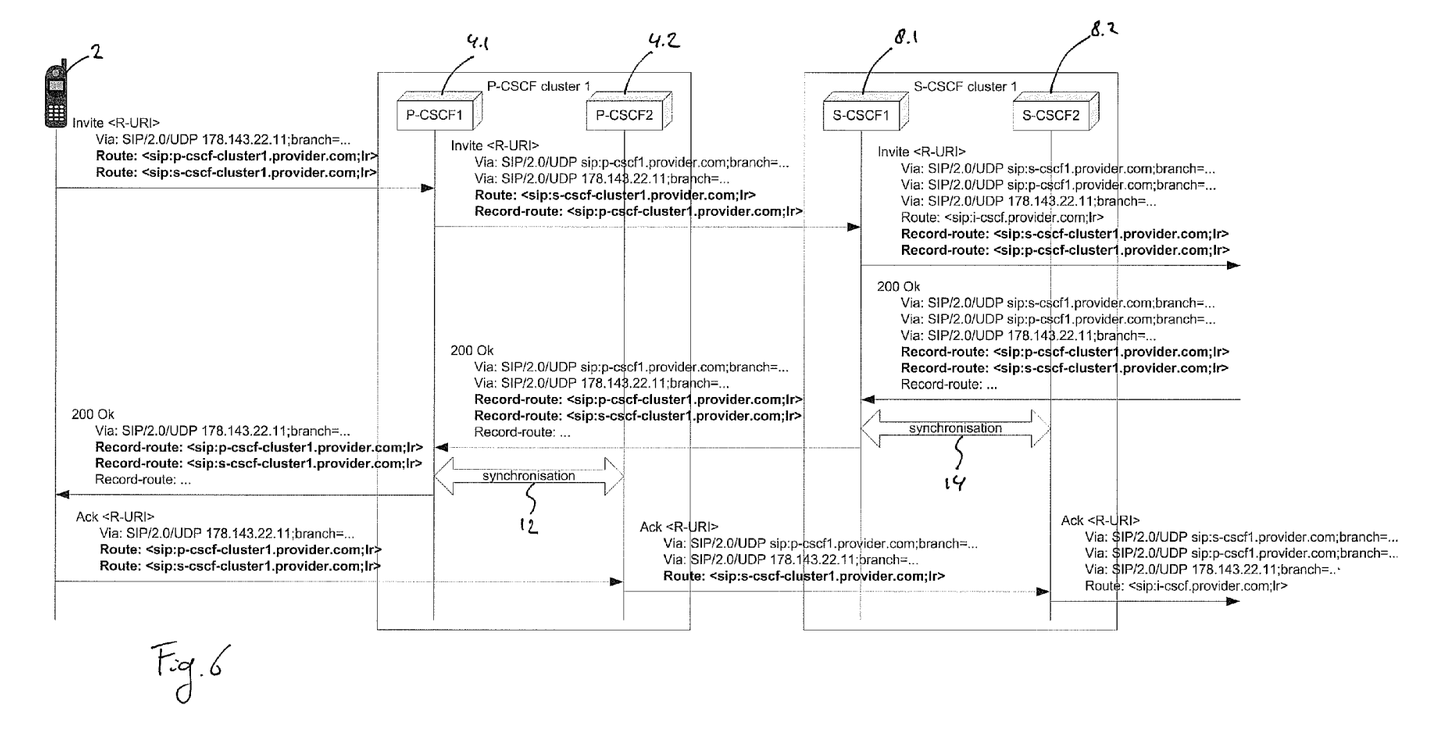
FIG. 6 shows an example of call establishment by a User Agent with transaction based synchronisation according to the invention.

FIG. 6 shows a simplified example of SIP session establishment by the SIP-UA, whereby data synchronization is applied for each completed SIP transaction.

In this example, the selected P-CSCF entity and the selected S-CSCF entity use the P-CSCF group identifier and S-CSCF group identifier, respectively, to set the Record route header. As a result, subsequent requests in the SIP session may be handled by any one of the proxy entities within the respective pluralities.

In this example, neither the data synchronization between P-CSCF entities in the plurality of P-CSCF entities nor the data synchronization between S-CSCF entities in the plurality of S-CSCF entities will be done through SIP signalling or through Diameter procedures. This approach results from the fact that the plurality of P-CSCF entities is addressed as and identifies itself as a single, logical P-CSCF entity.

In this example, when a P-CSCF entity has processed a registration procedure from a subscriber (Register transaction successfully completed), it uses data distribution techniques to share subscriber data with the other P-CSCF entities in the plurality of P-CSCF entities. This data distribution is preferably completed before the P-CSCF entity responds to the SIP-UA with a confirmation of the registration. A subsequent SIP session establishment or stand-alone SIP transaction may be handled by any of the P-CSCF entities in the plurality of P-CSCF entities, as each P-CSCF entity will have (access to) the subscriber data resulting from the registration.

The P-CSCF entities in the plurality may each have a database. Alternatively, the P-CSCF entities may have access to a shared database. The same principle can be applied to the S-CSCF entities. A shared database is a common technique for redundant computer systems.

Likewise, S-CSCF entities in the plurality of S-CSCF entities use data distribution techniques to share subscriber data with the other S-CSCF entities in the plurality.

Planned server shutdown is described for a P-CSCF entity. It will be appreciated that the principle applies equally for a S-CSCF entity.

When a P-CSCF entity is to be put into maintenance, DNS 16, 16' could be modified such that DNS will from that moment on no longer return the host name and/or IP address for that particular P-CSCF entity. Due to caching by DNS clients, a defined grace period is preferably applied. After that grace period and resulting from the DNS modification, no node will select this particular P-CSCF entity anymore, when sending a SIP request message to the P-CSCF group identifier. Hence, the load will gradually be distributed over n-1 P-CSCF entities, i.e. the load on the other P-CSCF entities in the group will gradually increase.

When a particular P-CSCF entity is selected at SIP session establishment, this P-CSCF entity may be used for the entire SIP session. It is needed to monitor the SIP sessions in progress on the P-CSCF entity that is to be put in maintenance mode. All sessions being handled by this P-CSCF entity are preferably completed before the P-CSCF entity can be put into maintenance mode. By that time, all load related to the subscriber group is taken over by the other P-CSCF entities in the plurality of P-CSCF entities. The P-CSCF entity may now be put in maintenance mode.

When the concept of a logical P-CSCF entity is applied to a single SIP transaction instead of to a single SIP session, the above-referred additional grace period (time needed to monitor the P-CSCF entity for active transactions) will be much shorter, since the duration of a transaction is smaller than the duration of a SIP session.

When the P-CSCF entity is to be put back into operation, the following steps could be taken in this order (apart from other required steps needed to get the P-CSCF entity fully operational): the P-CSCF entity shall instruct its database to initiate data synchronization with the database(s) from the other P-CSCF entities in the plurality of P-CSCF entities; and when data synchronization is complete, DNS may be modified back, so nodes may select this particular P-CSCF entity when sending a SIP request message to the P-CSCF group identifier. Due to caching IP addressing in other nodes (specifically the SIP-UA and the S-CSCF entity), the load on this P-CSCF entity will gradually increase and the load on the other P-CSCF entities will gradually decrease.

In general, when, in the case of node failure or node shut down, the load from n P-CSCF entities or m S-CSCF entities needs to be taken over by n-1 P-CSCF entities or m-1 S-CSCF entities, respectively, these n-1 P-CSCF entities or m-1 S-CSCF entities preferably have sufficient capacity hereto. The network (node capacity and link capacity) is preferably dimensioned accordingly.

Below, node failure is described for a P-CSCF entity. It will be appreciated that the principle applies equally for a S-CSCF entity.

It is considered that in the case of node failure, ongoing transactions being handled by a P-CSCF entity may be not completed and ongoing SIP sessions may fail, presuming that data related to a SIP session is not synchronized during the SIP session. When a subsequent (i.e. within a Session) transaction request is directed to a particular P-CSCF entity whilst that particular P-CSCF entity has become inoperational since the establishment of the session, that transaction can't be handled by another P-CSCF entity. The unforeseen failure of transaction related signalling will have the effect that the transaction as such fails. In addition, if a SIP session is to be handled in its entirety by the same P-CSCF entity as where the SIP session establishment started, then P-CSCF entity failure has the effect that any SIP session being handled by that P-CSCF entity will fail (e.g. due to absence of heartbeat response messages).

When an entity establishes a SIP session or (stand-alone) SIP transaction towards the plurality of P-CSCF entities and this entity uses the (cached) host name/IP address of a P-CSCF entity that has node failure, then the SIP session establishment attempt or SIP transaction attempt will fail. DNS methodology may be applied in order to have this entity attempt to establish this SIP session/SIP transaction through any of the other P-CSCF entities. For example, when DNS query is applied for the plurality of P-CSCF entities, the DNS client may receive a set of IP addresses.

When the P-CSCF entity failure is detected, DNS may be modified as described above for planned server shutdown. Entities will then gradually no longer attempt to contact this P-CSCF entity, thereby reducing the negative effect of the node failure. New SIP sessions may then be handled by the remaining n-1 P-CSCF entities.

When the node is operational again, the steps for putting node back in operation, as described above for planned server shutdown, may be applied.

In the foregoing specification, the invention has been described with reference to specific examples of embodiments of the invention. It will, however, be evident that various modifications and changes may be made therein without departing from the broader spirit and scope of the invention as set forth in the appended claims.

In the preceding has been described that a group of P-CSCF entities may act as a logical P-CSCF entity. It has also been described that a group of S-CSCF entities may act as a logical S-CSCF entity. It will be appreciated that it is also possible that a group of P-CSCF entities acts as a logical P-CSCF entity while use is made of a single S-CSCF entity. It will be appreciated that it is also possible that a group of S-CSCF entities acts as a logical S-CSCF entity while use is made of a single P-CSCF entity.

It will be appreciated that the group of P-CSCF entities acting as the logical P-CSCF entity and/or the group of S-CSCF entities acting as the logical S-CSCF entity may be used for the establishment and continuation of a SIP session and/or the initiation of a stand-alone SIP transaction.

It will be appreciated that when a SIP session is established, any new SIP transaction initiated within this SIP session uses a signalling path that is the result of individual SIP proxies adding a Record-route header to the SIP Invite (not considering Back-to-back user agent). When a SIP proxy, e.g. a P-CSCF entity, adds a Record-route header to the SIP Invite, it may use the P-CSCF group identifier. This has the effect that subsequent transactions within this SIP session may be established through any of the P-CSCF entities within the group of P-CSCF entities associated with the group identifier. Alternatively, the P-CSCF entity may use its own name (address) as Record-route header. In that case, subsequent transactions within this SIP session will be established through this specific P-CSCF.

It will be appreciated that when subsequent transactions within a SIP session are established through any one of the P-CSCF entities within the group, the P-CSCF entity preferably ensures that data synchronization takes place, and preferably is completed, no later than the moment that the P-CSCF entity forwards the last Request or Response message related to this transaction. It will be appreciated that once the P-CSCF entity has forwarded the last Request or Response message related to this transaction, a subsequent transaction may be initiated that may be handled by another P-CSCF entity within the group. That other P-CSCF entity needs to have (access to) the up-to-date subscriber data.

It will be appreciated that the described method of data synchronization per transaction, if desired, may also be applied to record routing proxies that do not have subscriber data, such as Interconnection Border Control function (IBCF) entities. SIP transactions within one SIP session may then be spread over available IBCF entities within a group of IBCF entities.

However, other modifications, variations, and alternatives are also possible. The specifications, drawings and examples are, accordingly, to be regarded in an illustrative rather than in a restrictive sense.

In the claims, any reference signs placed between parentheses shall not be construed as limiting the claim. The word 'comprising' does not exclude the presence of other features or steps than those listed in a claim. Furthermore, the words 'a' and 'an' shall not be construed as limited to 'only one', but instead are used to mean 'at least one', and do not exclude a plurality. The mere fact that certain measures are recited in mutually different claims does not indicate that a combination of these measures cannot be used to advantage.

What is claimed is:

1. A method of transferring a first message and a second message, in a Session Initiation Protocol (SIP) based communications network, from a first node to a third node via a plurality of intermediate nodes, wherein the intermediate nodes are a user-to-network proxy entity, a registrar, or a service node, the method comprising:
   storing, in a repository associated with the first node, a group identifier associated with a plurality of intermediate nodes; and
   within a single session or within a single transaction of a session:
      deriving, by the first node and based on the group identifier, a network address corresponding to a first intermediate node of the plurality of intermediate nodes;
      transmitting, by the first node, the first message to the third node via the first intermediate node;
      synchronizing among the plurality of intermediate nodes data relating to at least one of the first node and the third node;
      deriving, by the first node and based on the group identifier, a network address corresponding to a second intermediate node of the plurality of intermediate nodes; and
      transmitting, by the first node, the second message to the third node via the second intermediate node.

2. The method of claim 1 the deriving comprises performing a Domain Name Server (DNS) query on the basis of the group identifier.

3. The method of claim 1 wherein the first message comprises the group identifier; the method further comprising:
   deriving, by the third node and based on the group identifier, a network address corresponding to one intermediate node of the plurality of intermediate nodes; and
   transmitting, in response to receiving the first message, a response from the third node to the first node via the one intermediate node derived by the third node.

4. A Session Initiation Protocol (SIP) based communications network, comprising:
   a first node;
   a plurality of intermediate nodes;
   a third node;
   wherein the first node has a repository associated therewith, the repository comprising a group identifier associated with a plurality of intermediate nodes;
   wherein the first node is configured to derive, based on the group identifier, a network address corresponding to a first intermediate node of the plurality of intermediate nodes for a first message of a SIP session or transaction;
   wherein the first node is further configured to derive, based on the group identifier, a network address corresponding to a second intermediate node of the plurality of intermediate nodes for a second message of the SIP session or transaction;
   wherein the first intermediate node is configured to synchronize data relating to at least one of the first node and the third node among the plurality of intermediate nodes; and
   wherein the network is configured to transmit the first message from the first node to the third node via the first intermediate node and
   to transmit the second message from the first node to the third node via the second intermediate node.

5. A network node for transmitting a first message and a second message to a recipient node via an intermediate node in a Session Initiation Protocol (SIP) based communications network, within a single SIP session or a single transaction within a SIP session; the network comprising:
   a repository containing a group identifier associated with a plurality of intermediate nodes; and
   wherein the network node is configured to:
      derive, based on the group identifier, a network address corresponding to one intermediate node of the plurality of intermediate nodes;
      transmit the first message to the recipient node via the one intermediate node derived by the network node;
      synchronize, among the plurality of intermediate nodes, data relating to at least one of the network node and the recipient node;
      derive, based on the group identifier, a network address corresponding to another intermediate node of the plurality of intermediate nodes; and
      transmit the second message to the recipient node via the other intermediate node derived by the network node.

6. The network node of claim 5 wherein the network node is a User Agent or Proxy Call Session Control Function entity.

* * * * *